US007726832B2

(12) United States Patent
Clark

(10) Patent No.: US 7,726,832 B2
(45) Date of Patent: *Jun. 1, 2010

(54) SHOWERHEAD WITH TURBINE DRIVEN LIGHT SOURCE

(76) Inventor: Frank Clark, 8220 La Mirada NE., Albuquerque, NM (US) 87109

( * ) Notice: Subject to any disclaimer, the term of this patent is extended or adjusted under 35 U.S.C. 154(b) by 0 days.

This patent is subject to a terminal disclaimer.

(21) Appl. No.: 12/127,711

(22) Filed: May 27, 2008

(65) Prior Publication Data

US 2008/0225517 A1 Sep. 18, 2008

Related U.S. Application Data

(63) Continuation of application No. 10/762,689, filed on Jan. 21, 2004, now Pat. No. 7,387,401.

(51) Int. Cl.
*B60Q 1/00* (2006.01)

(52) U.S. Cl. ............................ 362/192; 362/96; 290/54

(58) Field of Classification Search ................... 362/96, 362/192, 101, 231, 318, 800; 29/54; 4/596, 4/597
See application file for complete search history.

(56) References Cited

U.S. PATENT DOCUMENTS 2,068,757 A 1/1937 Mishelle
2,448,792 A 9/1948 Fraser
3,748,643 A * 7/1973 Jacobs ........................ 340/467
3,845,291 A 10/1974 Portyrata
3,924,808 A 12/1975 Cooley, Jr.
4,290,091 A 9/1981 Malcolm
4,330,089 A 5/1982 Finkbeiner
4,339,833 A 7/1982 Mandell
4,564,889 A 1/1986 Bolson
4,616,298 A 10/1986 Bolson
4,749,126 A 6/1988 Kessener et al.
4,854,499 A 8/1989 Neuman
4,936,508 A 6/1990 Ingalz
5,140,254 A 8/1992 Katzman
5,199,639 A 4/1993 Kobayashi
5,316,216 A 5/1994 Cammack
5,467,927 A 11/1995 Lee
5,675,846 A 10/1997 Kannenberg
5,927,332 A 7/1999 Richard
5,969,429 A 10/1999 Rudolph
6,021,960 A 2/2000 Kehat
6,036,333 A 3/2000 Spiller
7,178,746 B2 2/2007 Gross
7,387,401 B2 * 6/2008 Clark ........................ 362/192
2003/0147238 A1 8/2003 Allen
2004/0258567 A1 12/2004 Kokin et al.

* cited by examiner

*Primary Examiner*—Gunyoung T Lee
(74) *Attorney, Agent, or Firm*—DLA Piper LLP (US)

(57) ABSTRACT

A showerhead and fluid-driven lighting system is described herein. The showerhead has a hollow body configured to receive incoming fluid and a fluid distribution element configured to release outgoing fluid from the hollow body. The fluid driven turbine unit is configured to receive incoming fluid and release outgoing fluid to the showerhead, and one or more lights are electrically connected to the fluid driven power supply. The illumination of the water droplets and/or the translucent showerhead body by the lights creates a pleasant showering experience for the user.

23 Claims, 7 Drawing Sheets

SHOWERHEAD WITH TURBINE DRIVEN LIGHT SOURCE

RELATED APPLICATIONS

This application is a continuation of U.S. patent application Ser. No. 10/762,689 filed Jan. 21, 2004, which is incorporated herein by this reference.

FIELD OF THE INVENTION

The present invention relates generally to shower fixtures. More particularly, the present invention relates to a showerhead.

BACKGROUND OF THE INVENTION

The prior art is replete with showerhead designs. Conventional showerheads are merely designed to provide a stream or spray of water to the user and are not designed to provide pleasant visual effects to the user during use. Some shower or bath fixtures (such as a vanity mirror mounted in a shower stall) may include a lamp or a light source that illuminates the shower or bath space. Such light fixtures, however, are either battery powered or connected to the household electrical circuit. Unfortunately, battery powered lights require periodic replacement of the batteries, and light fixtures that utilize the household power supply are difficult to install.

BRIEF SUMMARY OF THE INVENTION

A showerhead according to the present invention produces pleasant visual effects to the user during use by providing lights that are powered by a water driven turbine.

The showerhead described herein includes a fluid driven lighting system. The showerhead includes a hollow body configured to receive incoming fluid and a fluid distribution element configured to release outgoing fluid from the hollow body. The fluid driven power supply is configured to receive incoming fluid from a fluid source and release outgoing fluid to the showerhead. The showerhead also includes one or more lights that are electrically connected to the fluid driven power supply.

In addition, a system according to the invention may employ additional elements including a rechargeable battery electrically connected to the fluid driven power supply and a fluid flow valve to regulate the flow of water.

In addition, a showerhead according to the invention may be formed from a translucent material. It might also employ an optical lens feature that provides pleasant visual effects to the user. The optical lens feature, combined with the cascading water, creates an invigorating and enjoyable showering environment.

In accordance with one embodiment of the invention, a water driven turbine is incorporated into a translucent showerhead having one or more lights. The water driven turbine comprises a housing having an internal fluid path configured to receive incoming fluid from a fluid source and release outgoing fluid to the translucent showerhead. A rotatable turbine wheel is positioned in the fluid path and a generator is positioned proximate the housing with one or more electrical wires for connecting with the one or more lights. The fixture may employ a turbine shaft connecting the turbine wheel and generator. In operation, the lights illuminate the translucent showerhead and/or the water released from the showerhead.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Also, use of the “a” or “an” are employed to describe elements and components of the invention. This is done merely for convenience and to give a general sense of the invention. This description should be read to include one or at least one and the singular also includes the plural unless it is obvious that it is meant otherwise.

Figure 1:
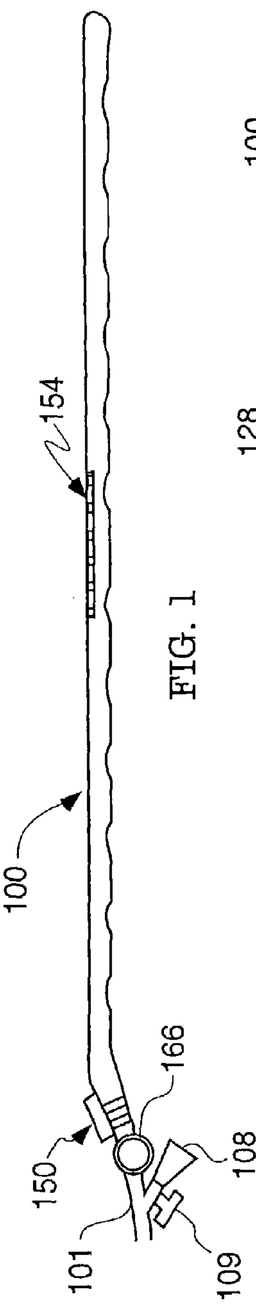
FIG. 1 is a side view of a showerhead.
Figure 2:
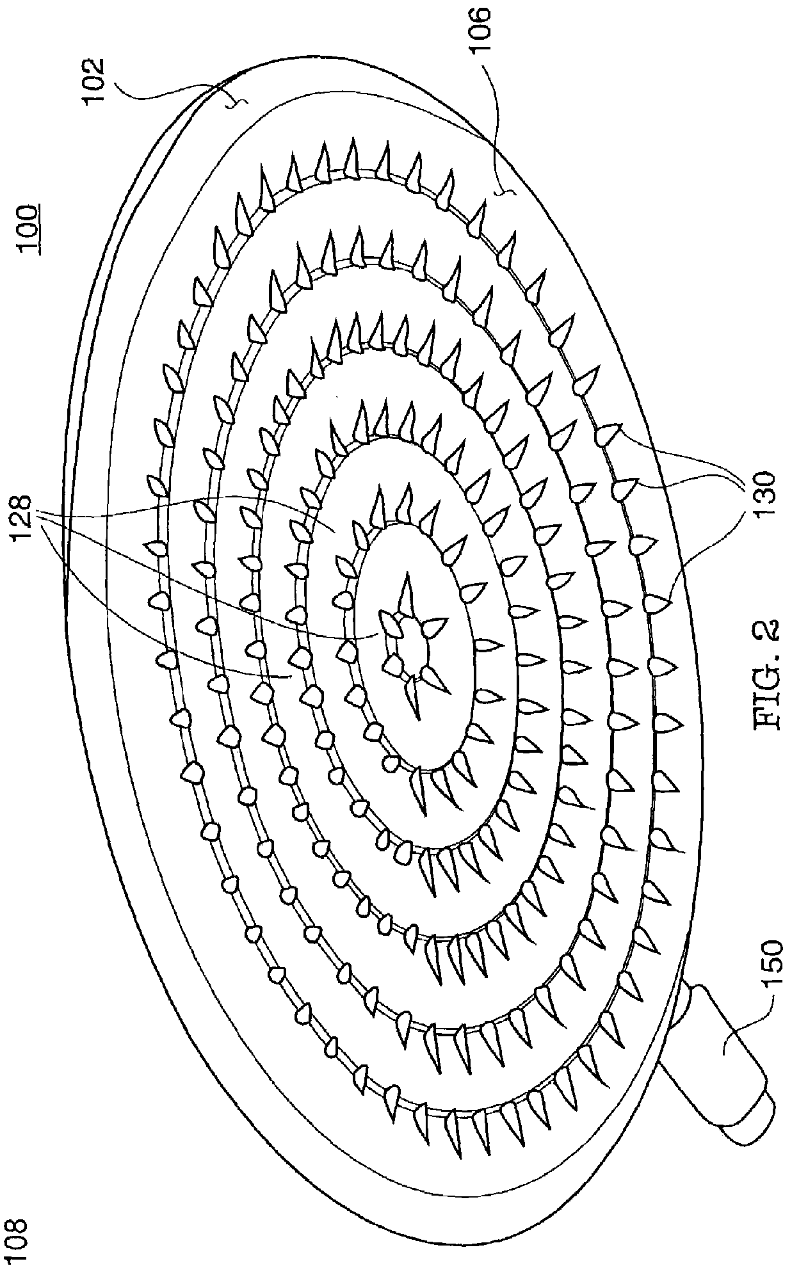
FIG. 2 is a perspective view of the showerhead of FIG. 1, showing its water distribution side.
Figure 3:
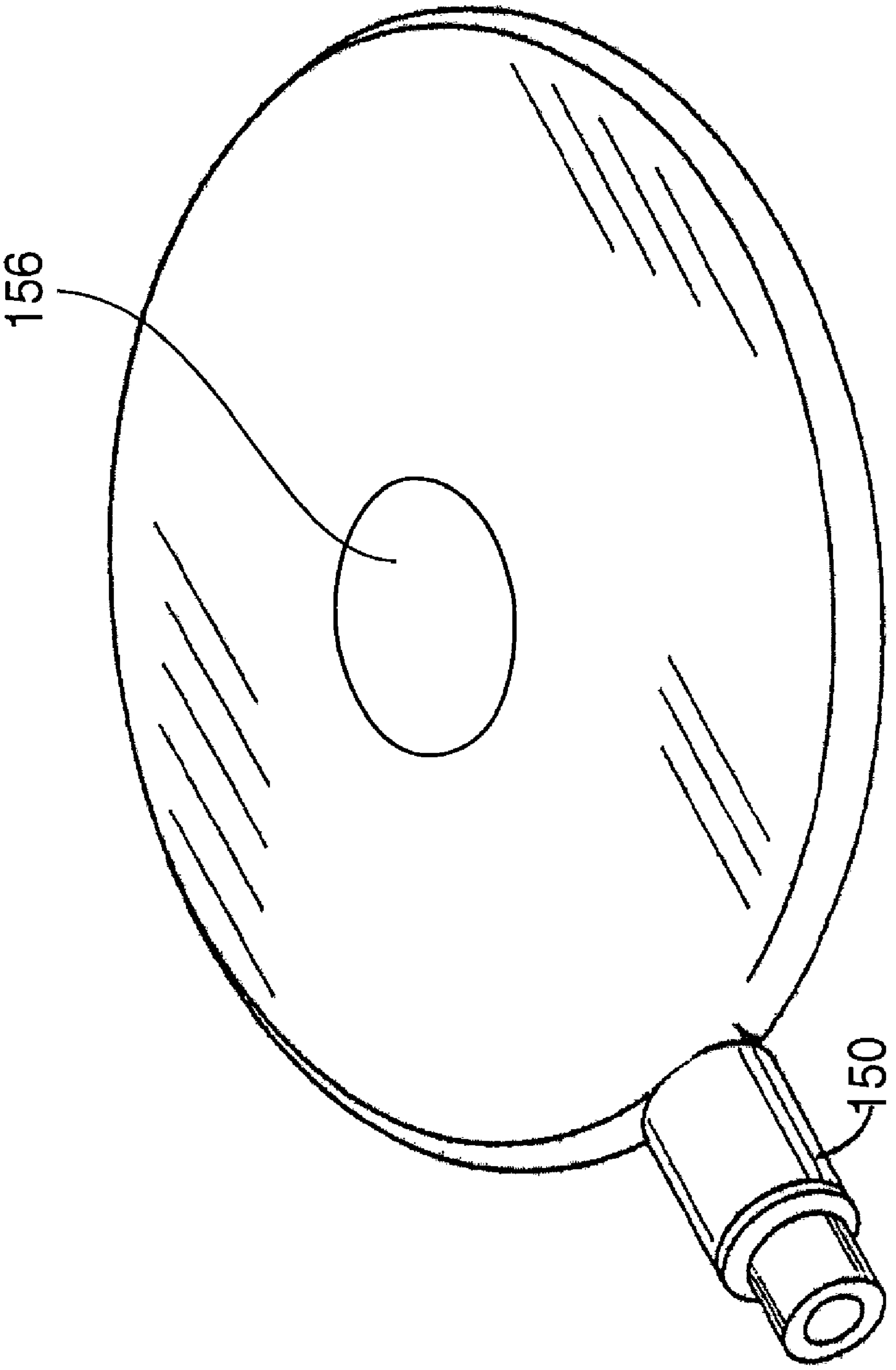
FIG. 3 is a perspective view of the showerhead of FIG. 1, showing its light mounting side.
Figure 4:
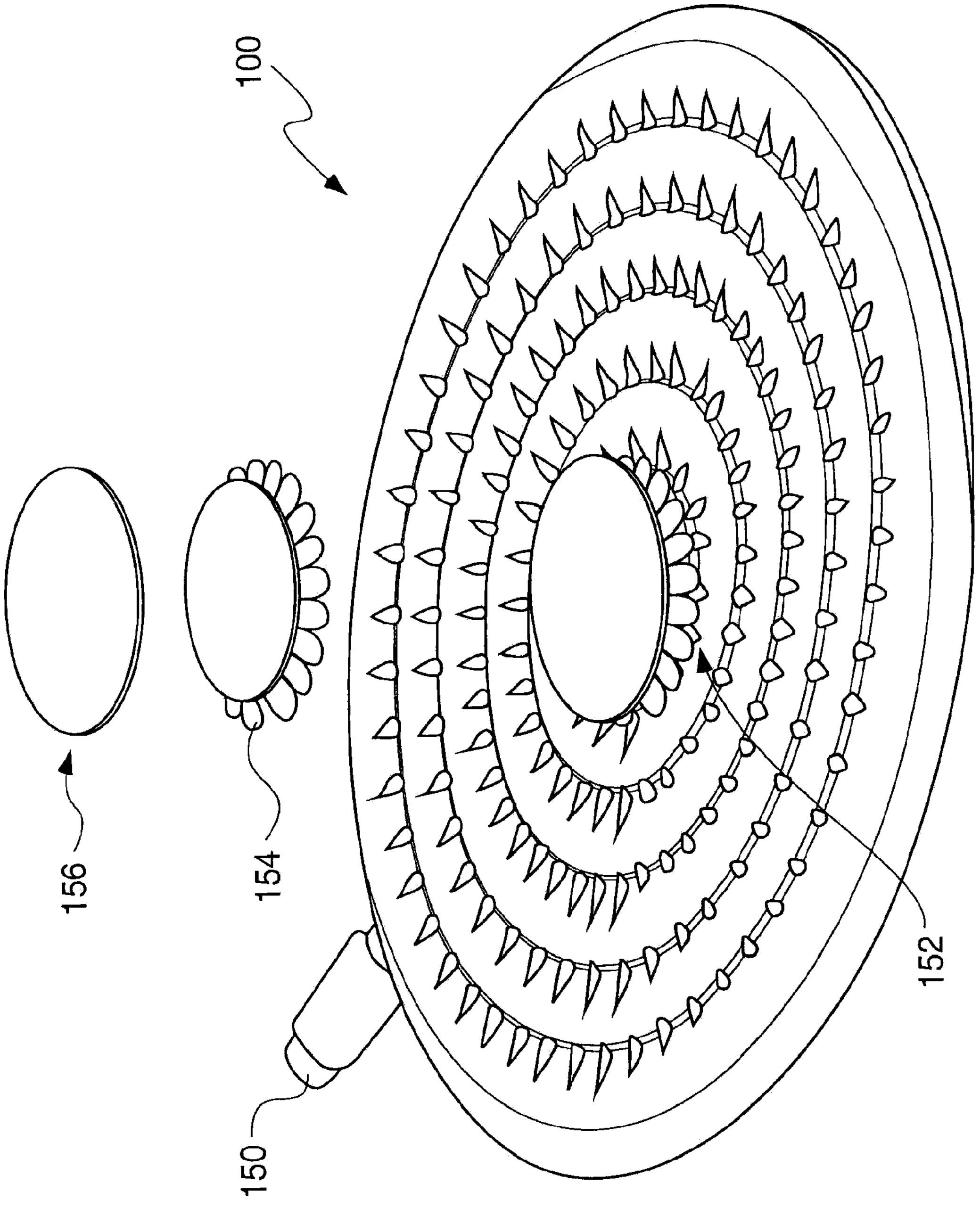
FIG. 4 is an exploded perspective view of the light mounting side of the showerhead shown in FIG. 1.

FIG. 1 is a side view showing a showerhead 100 that includes water driven turbine 150 capable of generating power for one or more lights 154. The showerhead 100 may also be used in conjunction with a conventional showerhead or water spray nozzle 108. The showerhead 100 and water spray nozzle 108 may utilize one or more flow valves 109, 166 to regulate the fluid flow. FIG. 2 is a perspective view of one side of a showerhead 100, and FIG. 3 is a perspective view of the other side of the showerhead 100. FIG. 2 shows the water distribution side of the showerhead 100, while FIG. 3 shows the light mounting side of the showerhead 100. FIG. 4 is an exploded three-dimensional perspective rendition of the light mounting side of the showerhead 100 including a cavity 152, one or more lights 154 and a cover 156.

In typical installations, the showerhead 100 is attached to a plumbing feature 101, e.g., a water pipe that protrudes from a wall. Of course, the showerhead 100 may be installed in any number of alternate mounting configurations, such as that shown in FIG. 1. The showerhead 100 may be connected to the water pipe via a suitable conduit, which may include one or more interconnected pipes, hoses, or the like. The showerhead 100 may include a suitably configured mounting element, e.g., a swivel joint, a telescoping joint, a ball joint, or a rotating joint. The mounting element allows the user to adjust the position of the showerhead 100 and, consequently, the direction of the exiting water flow. In the embodiment shown in FIG. 1, the water pipe 101 is a "Y" configuration and directs water to the showerhead 100 and the water spray nozzle 108. Although not a requirement of the invention, the showerhead 100 may include a flow valve 166 for controlling the flow of fluid entering showerhead 100. The flow valve 166 may be utilized in conjunction with existing hot and cold water valves (or a combined hot and cold water regulator) to provide an added measure of water flow control.

Although the showerhead 100, water driven turbine 150 and lights 154 shown and described herein are arranged in a single unit, the present invention is not so limited. Indeed, the features of the water driven turbine 150 described below can also be used by itself, with a variety of lights, with standard showerheads and with other configurations and arrangements that may not be specifically addressed herein.

To provide a pleasing environment for the user and to reduce water consumption, the showerhead 100 may by suitably configured to provide the gentle distribution of water droplets over a relatively wide area. In the operating mode, water is routed within the showerhead 100 for release by a water distribution element 106 (upon which the water distribution surface 102 is formed). The water distribution element 106, and certain aspects thereof, are shown in FIGS. 7-10. In another embodiment, the showerhead 100 is used in conjunction with a conventional water spray nozzle 108, as shown in FIG. 1. In this operating mode, water is routed by the water pipe 101 to either the showerhead 100, the water spray nozzle 108 or both. The particular mode of operation is selected by one or more flow valves, which may be incorporated into the showerhead 100, the water pipe 101, the conventional showerhead 108 and/or the water driven turbine 150. In another embodiment, the showerhead 100 and the water spray nozzle 108 may have separate water pipes 101, with or without flow valves.

The showerhead 100 need not be used with the spray nozzle 108. For example, FIG. 4 depicts another embodiment that only incorporates the water driven turbine 150. FIG. 4 is an exploded three-dimensional perspective rendition of a showerhead 100, showing the translucent (or transparent) characteristics of the showerhead and a cavity 152, into which are placed one or more lights 154, and the cover 156. In this embodiment, the water driven turbine 150 is used to power the one or more lights 154. In other embodiments, the one or more lights 154 may be integral or molded into the showerhead 100. In still other embodiments, the one or more lights 154 may be configured in a wafer form and attached to the showerhead 100 with a suitable material, such as an adhesive. In this embodiment, the showerhead 100 need not have a cavity or a cover. In another embodiment, the one or more lights 154 may illuminate in one or more colors, or vary in colors. In a practical embodiment, light emitting diodes (LEDs) may be utilized for the lights 154. The color, size, shape, and electrical characteristics of the LEDs can vary to suit the particular application and/or illumination requirements.

Figure 5:
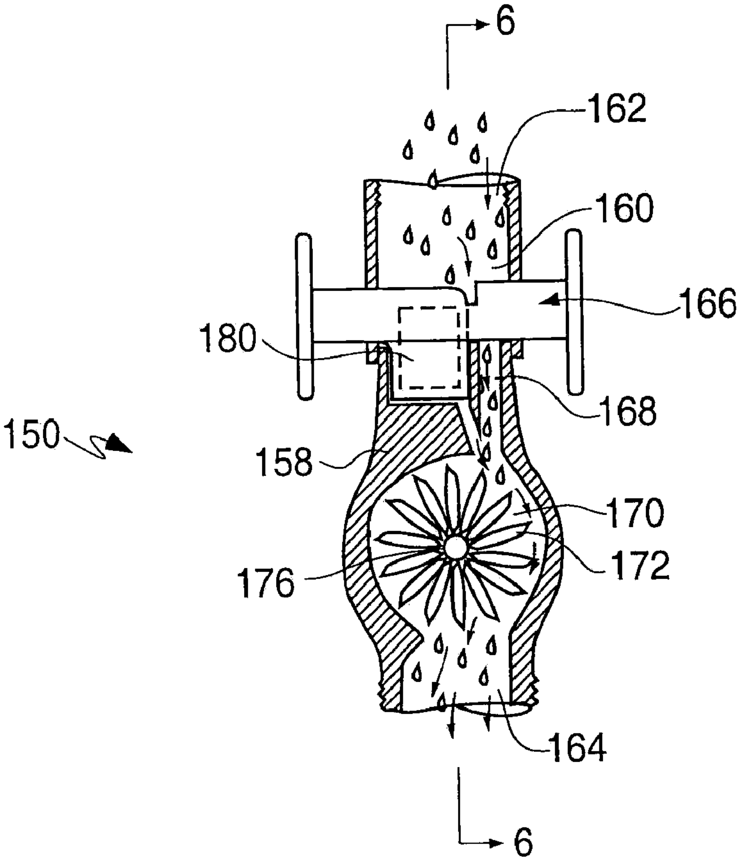
FIG. 5 is a sectional top view of a water driven turbine as viewed along line A-A in FIG. 6.
Figure 6:
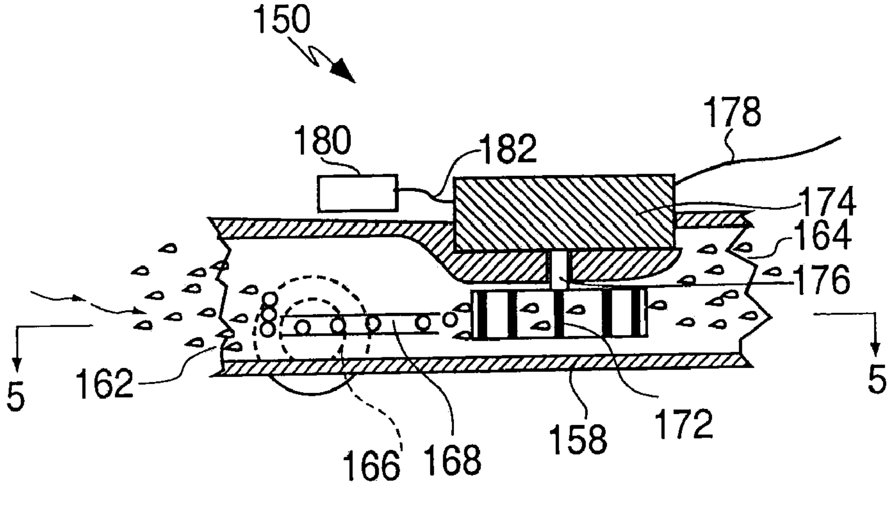
FIG. 6 is a sectional side view of the water driven turbine as viewed along line B-B in FIG. 5.

FIGS. 5 and 6 show more details of the water driven turbine 150. While the water driven turbine 150 is described as a separate device, in other embodiments it may be integral with the showerhead 100. In the example embodiment, the turbine element 150 is positioned within the stem of the showerhead 100. Briefly, the water driven turbine 150 includes a housing 158 with a fluid channel 160 defined therein having a fluid inlet portion 162, and a fluid outlet portion 164. The turbine 150 unit may also include a flow valve 166. The fluid inlet portion 162 is suitably configured to be connected to a water source, such as a water pipe 101, for which the fluid inlet portion 162 may have ½ inch female threads. The fluid outlet portion 164 is suitably configured to be connected to the showerhead 100, and may be configured with ½ inch male threads. The dimensions of the fluid channel 160 may vary along its length. The fluid channel 160 may narrow to form a velocity chamber 168 which leads to an open portion 170. The open portion 170 is configured to accept a turbine wheel 172. The turbine wheel 172 is connected to a generator 174 by a turbine shaft 176.

In use, the turbine wheel 172 is positioned within the fluid channel 160 and as the fluid flows through the fluid channel 160, the fluid spins or rotates the turbine wheel 172 and turbine shaft 176. This rotation causes the generator 174 to generate electrical power, which is transferred to one or more lights 54 by electrical wires 178. As shown in the figures, the generator 174 may be mounted to a surface of the housing 158 and the turbine shaft 176 is positioned in a through-opening through the housing 158. Appropriate seals or gaskets should be used to prevent fluid leaking. In one embodiment, the external dimensions of the generator 174 form a disk or wafer shape being approximately 1 inch in diameter and ⅜ inch thick and attached to the housing 158 with appropriate means, such as fasteners or adhesives. A DC generator 174 may be used that is capable of an output of 1.5 to 2.5 volts to power low voltage lights, such as LED lights.

In other embodiments, a back-up power source may be desirable to power the lights 154 for a time while the water driven turbine 150 is not producing power, such as when the water is turned off. The may be accomplished by using a re-chargeable battery 180 attached to the motor 174 with appropriate wiring 182 and circuitry. While the water driven turbine 150 is functioning properly, it should be capable of powering the lights 154 and re-charging the battery 180.

Figure 7:
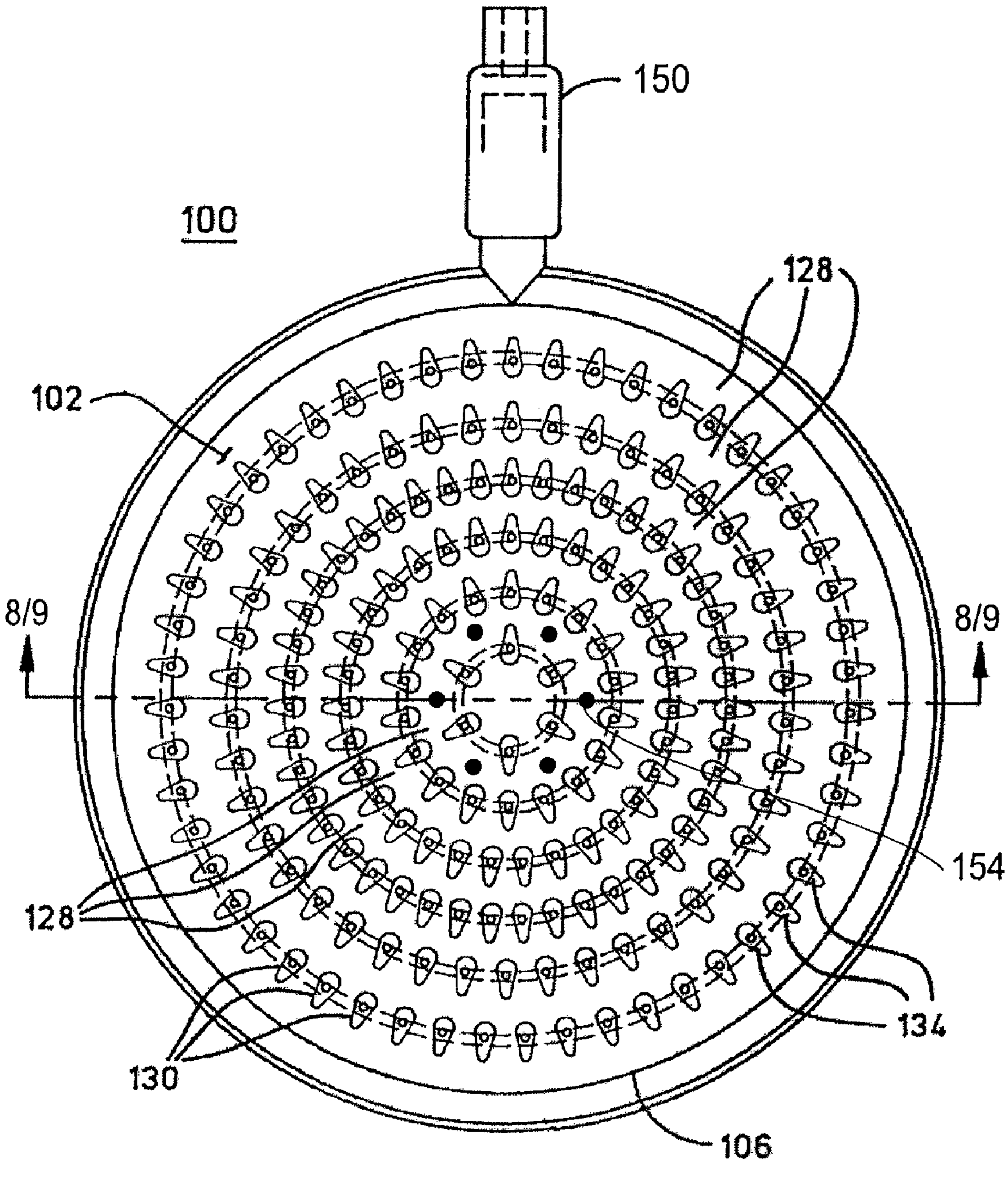
FIG. 7 is a plan view of the water distribution side of the showerhead.
Figure 8:
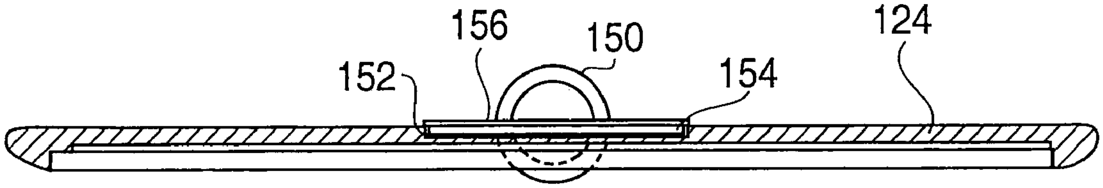
FIG. 8 is a sectional view of the showerhead (with the water distribution plate removed) as viewed from line C-C in FIG. 7.
Figure 9:
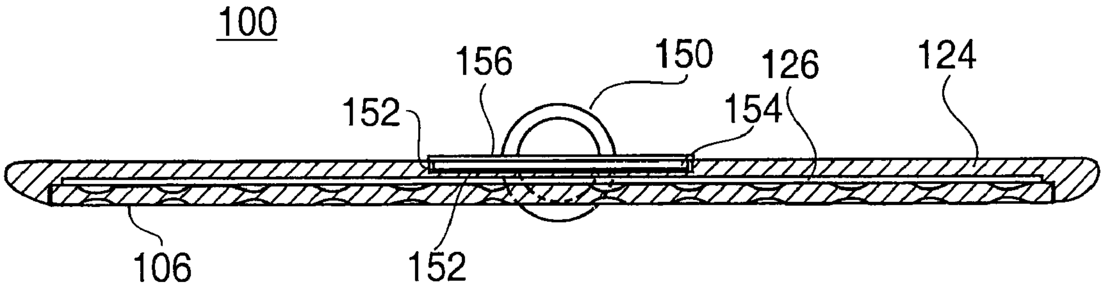
FIG. 9 is a sectional view of the showerhead (with the water distribution plate installed) as viewed from line C-C in FIG. 7.

FIG. 8 is a sectional view of the showerhead 100 (with the water distribution plate 106 removed) as viewed from line C-C in FIG. 7, and FIG. 9 is a sectional view of the showerhead 100 (with the water distribution plate 106 installed) as viewed from line C-C in FIG. 7. In accordance with one practical embodiment, the showerhead 100 is formed by coupling the water distribution element 106 to a main body portion 124 of the showerhead 100 as shown in FIG. 9. The lighting element is positioned within or on top of the showerhead 110 so that the one or more lights 154 shine through the translucent material of the distribution element 106 and main body portion 124.

Although the figures depict a generally round showerhead body, the present invention is not limited to any specific shape or size. The showerhead 100 generally includes a hollow body (which is formed by the main body portion 124 and the water distribution element 106 in the example embodiment), a fluid chamber 126 within the hollow body, and the fluid distribution element 106. Each of these components is described in more detail below.

The hollow body, and the main body portion 124 in particular, provides the structural foundation for the showerhead 100 and support for the one or more lights 154. In one embodiment, the main body portion 124 includes a cavity 152 and a cover 156. The main body portion 124 is preferably formed from a translucent (clear or colored) or transparent material such as plastic or resin. In accordance with one practical embodiment, the main body portion 124 is formed from an optical grade plastic. Although not a requirement of the present invention, the main body portion 124 may be integrally formed as a one-piece unit. In the illustrated embodiment, the hollow body of the showerhead 100 is circular in shape and its height is substantially less than its diameter. For example, the showerhead 100 may have an overall diameter of approximately 11-12 inches, and a height of approximately 0.4 to 0.6 inches. As mentioned above, the hollow body includes a fluid inlet for receiving incoming fluid, such as water. In practical applications, the fluid inlet is coupled to the water driven turbine 154 that provides water to the showerhead 100. The size, shape, and/or location of the fluid inlet on the showerhead 100 may vary from unit to unit depending upon the desired fluid flow characteristics, fluid chamber size, back pressure specifications, showerhead size, and other practical considerations.

Referring again to FIG. 9, the fluid chamber 126 is defined by the interior side of the fluid distribution element 106, and by a thin cavity formed within the main body portion 124. The fluid chamber 126 is suitably configured to receive fluid from the water driven turbine 104. The hollow body is sized and shaped such that the fluid chamber 126 is relatively flat and thin. This configuration allows the fluid chamber 126 to be quickly filled and pressurized with fluid. In addition, the relatively low volume defined by the fluid chamber 126 ensures that water is conserved during operation of the showerhead 100 and the light is able to shine through.

Figure 10:
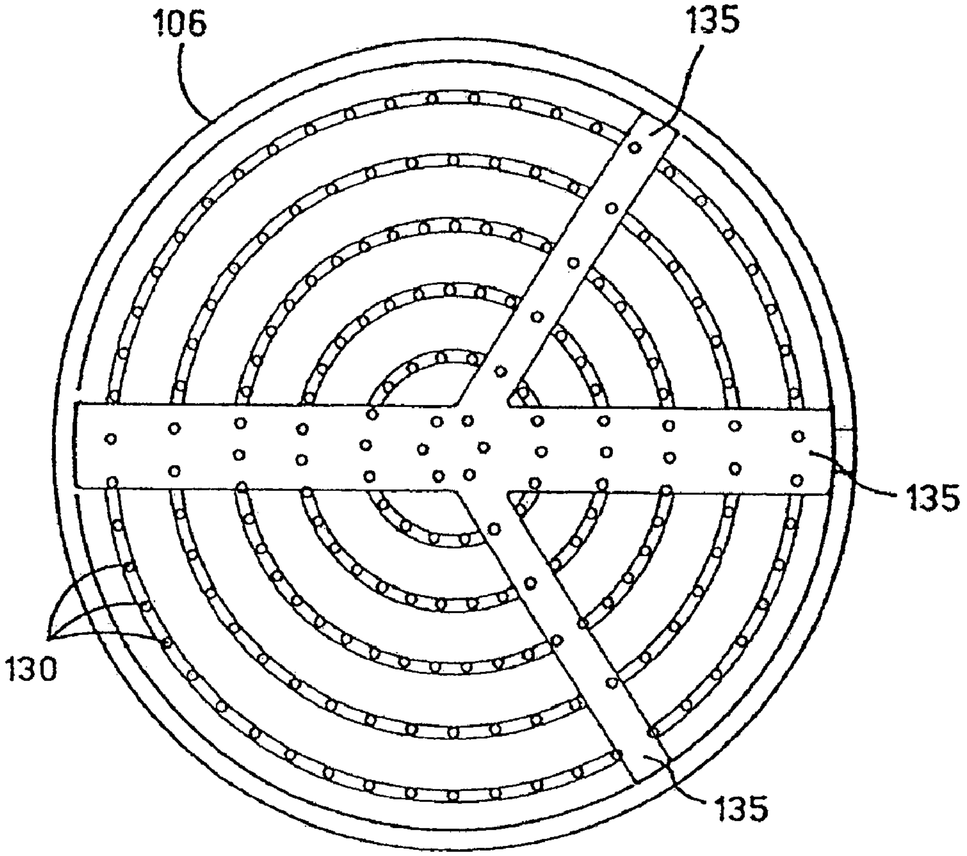
FIG. 10 is a plan view of the opposite side of the water distribution plate shown in FIG. 7.

The fluid distribution element 106 is attached to the main body portion 124 such that it forms an exterior surface of the showerhead 100. A practical embodiment utilizes a translucent (clear or colored) or transparent fluid distribution element 106. In this regard, the fluid distribution element 106 and the main body portion 124 can be formed from the same material, e.g., plastic, optical grade plastic, resin, plexiglass, or the like. Briefly, the fluid distribution element 106 is suitably configured to release fluid obtained from the fluid chamber 126 in a gentle dripping action. The interior side of the fluid distribution element 106 faces the fluid chamber 126 and the exterior side of the fluid distribution element 106, which is opposite the interior side, is textured with one or more fluid-releasing protrusions. The exterior side is shown in FIG. 7 and the interior side is shown in FIG. 10.

The fluid distribution element 106 includes one or more protrusions on its exterior side. In the illustrated embodiment, the protrusions are arranged as a plurality of raised and concentric rings 128. Each of the rings 128 has a curved convex surface when viewed in cross section. As described in more detail below, the "peaks" of the rings serve as the fluid release points due to the transport of fluid across the fluid distribution element 106. The fluid distribution element 106 also contains a number of "valleys" or depressions formed between the protrusions. The example embodiment includes circular valleys formed between two concentric rings. In lieu of such rings, the fluid distribution element 106 may employ a number of raised bumps, a raised serpentine segment, intersecting protrusions, shapes having varying heights, and the like.

The fluid distribution element 106 includes a number of outlets 130 formed therein. Generally, each outlet 130 provides a fluid path from the fluid chamber 126 to the fluid distribution surface 102 of the showerhead 100. In this regard, the fluid chamber 126 serves as a fluid source for the fluid distribution element 106. The fluid enters each outlet 130 at the interior side of the fluid distribution element 106 and exits each outlet 130 at the exterior side of the fluid distribution element 106. In the example embodiment, the outlets 130 are arranged in a circular pattern as viewed from the interior side of the fluid distribution element 106 (see FIG. 10). The interior side of the fluid distribution element 106 may include one or more channels 135 formed therein. These channels 135 direct the flow of fluid from the inlet of the showerhead 100 to various points within the fluid chamber 126. The channels 135 can be sized and shaped to promote uniform fluid pressure within the fluid chamber 126 such that drops are evenly formed across the fluid distribution element 106.

Although the specific size, shape, and configuration of each outlet 130 may vary from one practical embodiment to the next, and/or vary within the fluid distribution element 106 for a given practical embodiment, the preferred outlet configuration is depicted in the drawings of the example embodiment. Each outlet 130 may have an outline/perimeter 134 such as a teardrop shape shown in FIG. 7.

The fluid distribution element 106 may include a number of protrusions (e.g., raised rings 128) that facilitate the collection and release of fluid. As the water seeps into from the outlet 130, it to the walls of the drip ring protrusions 128. The positioning of the outlets 130 relative to the protrusions 128 facilitates the desired drop formation and cascade pattern.

As mentioned previously, the protrusions 128 provide a texturized outer surface for the fluid distribution element 106. In the normal operating orientation, water is released at a relative high point before traveling through the outlets 130 and onto the protrusions 128. Eventually, the water drops from the relative low points (the fluid release points) defined by the protrusions 128 (see FIG. 11).

Figure 11:
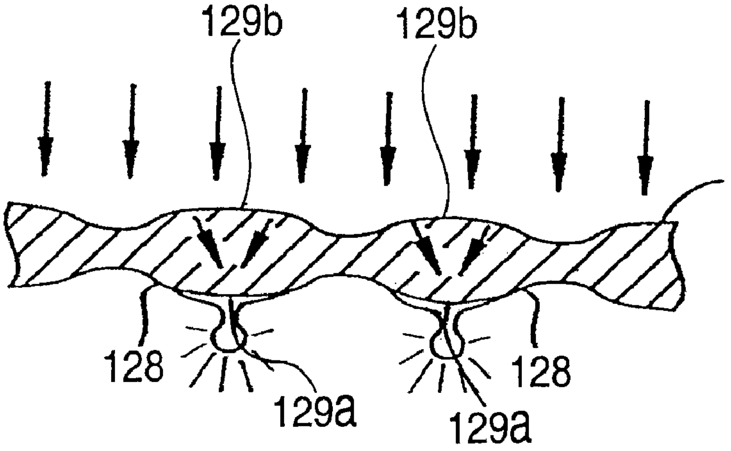
FIG. 11 is a schematic representation of a portion of a water distribution plate with water droplets formed thereon.

The creation of a substantially uniform and distributed back pressure of fluid within the fluid chamber 126, in conjunction with the configuration of the fluid distribution element 106, facilitates the even release of fluid droplets across the face of the showerhead 100. Relying upon the surface tension of the fluid and the configuration of the outlets 130 (and perimeters 134), the fluid distribution element 106 transports the fluid from the outlet holes 130 located above the textured drip point on the face of the fluid distribution element 106. The result is the formation of a droplet as the fluid travels to the fluid release points defined by the peaks of the protrusions. The drops are forced in a relatively slow manner from the face of the fluid distribution element 106 by both gravity and by continuing seepage from the fluid chamber 126. This surface tension effect and the formation of droplets is depicted in FIG. 11. Notably, the droplet size can vary depending upon the specific texturing of the fluid distribution element 106. For instance, larger bumps, peaks, raised ridges, or texturing can generate larger droplets, and smaller bumps, peaks, raised ridges, or texturing can generate smaller droplets. Generally, the size and shape of each protrusion in the texture pattern can be designed such that it retains more or less water before releasing the droplet. In the example embodiment, the one or more lights can illuminate the droplets as they are released from the distribution element 106.

The showerhead 100 can also include an optical lens element that is configured to receive the light rays from the one or more lights 154, refract the light rays, and create exiting light rays that illuminate outgoing fluid emitted from the fluid distribution element 106. In the example embodiment, the optical lens element is incorporated into the body of the showerhead 100. For example, both the main body portion 124 and the fluid distribution element 106 can be formed from a translucent or transparent material that accommodates the one or more lights 154, transmission and propagation of light. Furthermore, the stem portion of the showerhead 100 (located between the wall fixture and the main body portion 104 in the illustrated embodiment) can also be formed from a translucent or transparent material such as plastic or resin. The one or more lights 154 may display one or more colors to complement the translucent or transparent material of the showerhead. In the illustrated embodiment, the optical lens element is integral to the fluid distribution element 106. More particularly, the raised concentric rings 128 serve as the optical lens element, where each ring 128 can be considered to be a separate lens component. Accordingly, the protrusions on the fluid distribution element 106 are configured to distribute the water and form droplets in a predictable manner, and to provide the optical lens effect.

As shown in FIG. 11, each of the raised rings 128 has a convex external surface 129*a*. In practice, the convex shape of the rings 128 produces the optical lens effect for refracting and focusing light. As depicted in FIG. 11, the interior side of the fluid distribution element 106 may also include a pattern of raised concentric rings 129*b* that matches the pattern on the opposite side 129*a*. Consequently, each ring 128 can be realized as a ring-shaped lens having two opposing convex surfaces 129*a*, 129*b*. FIG. 11 includes a schematic representation of how light rays (shown as vertical and parallel arrows) are received and refracted by the fluid distribution element 106. In practice, the optical lens feature of the showerhead 100 can focus or direct the light rays toward the fluid release points on the fluid distribution element 106. In this manner, droplets of water can be illuminated as they are being formed on the fluid distribution element 106 and as they are released from the showerhead 100. FIG. 11 depicts two droplets being illuminated by light rays focused by the raised concentric rings 128 of the example embodiment.

If the entire hollow body of the showerhead 100 is formed from a translucent material, then light rays from the lights 154 and incident light rays can enter the fluid distribution element from any number of directions. The incident light ray can be natural sunlight and/or generated by one or more lighting fixtures. The light from the one or more lights 154 can be white or colored and may be polarized using appropriate lenses. The body of the showerhead 100 may be formed from a colored translucent material such that the spectrum of the light is modified as it passes through the optical lens element. Furthermore, fluid and/or bubbles passing through the hollow body and/or stem of the showerhead 100 can modify the characteristics of the exiting light rays, resulting in varied optical effects experienced by the user.

As water drips from the showerhead 100, the optical lens element concentrates light on the water droplets, thus creating a scintillating, sparkling, flickering, and/or "firefly" effect as the water is released from the showerhead 100. Indeed, the showerhead 100 itself can also be illuminated by the lights 154 to provide a lamp or glowing effect. Different visual effects can be generated depending upon the orientation, intensity, color, and configuration of the light 154 or other light sources. These lighting effects can enhance the showering experience for the user.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A fluid driven lighting system, comprising:

a showerhead including a body portion and an optical lens element including a plurality of fluid release points for emitting fluid and including a plurality of concentric rings, each ring having opposing convex surfaces to receive incident light rays, refract the incident light rays, and focus exiting light rays toward the fluid release points to illuminate outgoing fluid emitted from the fluid release points on the optical lens element;

one or more lights attached to the body portion such that beams from the one or more lights are directed toward the optical lens element and the outgoing fluid; and a fluid driven power supply in electrical communication with the one or more lights, the fluid driven power supply configured to receive incoming fluid and release outgoing fluid to the showerhead so as to light the one or more lights.

2. The system according to claim 1, wherein the fluid driven power supply is a water driven turbine that includes:

a housing having an internal fluid path with a fluid inlet and a fluid outlet;

a rotatable turbine wheel positioned in the internal fluid path;

a generator positioned proximate the housing; and a turbine shaft connecting the rotatable turbine wheel and the generator.

3. The system according to claim 2, wherein the housing further includes a fluid flow valve.

4. The system according to claim 1, wherein the one or more lights produce one or more colors.

5. The system according to claim 1, wherein the one or more lights illuminate fluid released by the showerhead.

6. The system according to claim 1, wherein the one or more lights comprise one or more light emitting diodes.

7. The system according to claim 1, wherein the showerhead is formed from a translucent material.

8. The system according to claim 7, wherein the one or more lights are integral to the translucent material.

9. The system according to claim 7, wherein the one or more lights illuminate the translucent material.

10. A fluid driven lighting system according to claim 1, wherein the fluid release points are configured to form fluid droplets and the optical lens element further focuses exiting light rays on the fluid droplets.

11. An illuminating showerhead assembly comprising:

a hollow body formed from a translucent material, the hollow body being configured to receive incoming fluid;

a fluid distribution element configured to release outgoing fluid from the hollow body;

an optical lens element integral to the fluid distribution element, the optical lens element having integral fluid outlets for passage of the outgoing fluid, the optical lens element including a plurality of concentric rings, each ring having opposing convex surfaces to receive incident light rays, refract said incident light rays, and focus exiting light rays towards the integral fluid outlets to illuminate the outgoing fluid passed from the integral fluid outlets on the optical lens element;

one or more lights attached to the hollow body such that beams from the one or more lights are directed toward the optical lens element and the outgoing fluid; and a fluid driven power supply in electrical communication with the one or more lights, the fluid driven power supply configured to receive inlet fluid from a fluid source and release fluid to the hollow body so as to light the one or more lights.

12. The assembly according to claim 11, wherein the fluid driven power supply comprises a water driven turbine having:

a housing having an internal fluid path with a fluid inlet and a fluid outlet;

a rotatable turbine wheel positioned in the internal fluid path;

a generator positioned proximate the housing; and a turbine shaft connecting the rotatable turbine wheel and the generator.

13. The assembly according to claim 11, wherein the one or more lights are integral to the hollow body.

14. The assembly according to claim 11, wherein the one or more lights illuminate fluid released by the hollow body.

15. The assembly according to claim 11, wherein the one or more lights comprise one or more light emitting diodes.

16. The assembly according to claim 11, wherein the one or more lights illuminate the hollow body.

17. The assembly according to claim 11, wherein the integral fluid outlets are configured to form fluid droplets and the optical lens element further focuses exiting light rays on the fluid droplets.

18. A water fixture comprising:

a water inlet;

a water outlet;

an inline water driven power supply located between the water inlet and the water outlet, the inline water driven power supply being configured to receive an incoming water flow from the water inlet, generate electrical power from the incoming water flow, and release an outgoing water flow to the water outlet;

a translucent hollow body coupled to the water driven power supply between the water inlet and the water outlet, the translucent hollow body having an optical lens element configured as the water outlet, and further including a plurality of concentric rings, each ring having opposing convex surfaces to receive incident light rays, refract the incident light rays, and focus exiting light rays toward the fluid release points to illuminate the outgoing fluid passed from fluid release points on the optical lens element; and one or more lights powered by the electrical power from the inline water driven power supply, the one or more lights being attached to the hollow body such that beams from the one or more lights are directed toward the optical lens element and the outgoing fluid.

19. A water fixture according to claim 18, wherein the inline water driven power supply comprises:

a housing having an internal fluid path configured to receive the incoming water flow and release the outgoing water flow to the water outlet; a rotatable turbine wheel positioned in the internal fluid path; a generator positioned proximate the housing; and a turbine shaft connecting the rotatable turbine wheel and the generator.

20. A water fixture according to claim 18, further comprising a translucent showerhead located between the water inlet and the water outlet, wherein the one or more lights illuminate the translucent showerhead.

21. A water fixture according to claim 18, further comprising a showerhead located between the water inlet and the water outlet, wherein the one or more lights illuminate outgoing fluid emitted from the showerhead.

22. A water fixture according to claim 18, wherein the fluid release points are configured to form water droplets and the optical lens element further focuses exiting light rays on the water droplets.

23. A fluid driven lighting system, comprising:

a showerhead including a body portion and an optical lens element including a plurality of fluid release points for emitting fluid and including a plurality of lens regions, each lens region having a convex surface with at least one of the plurality of fluid release points disposed thereon, each lens region to receive incident light rays, refract the incident light rays, and focus exiting light rays toward the fluid release points to illuminate outgoing fluid emitted from at least one of the plurality of fluid release points of the lens region;

one or more lights attached to the body portion such that beams from the one or more lights are directed toward the optical lens element and the outgoing fluid; and a fluid driven power supply configured to receive incoming fluid and release outgoing fluid to the showerhead and in electrical communication with the one or more lights so as to light the one or more lights, wherein the lens regions are arranged as concentric rings; and wherein each concentric ring has opposing convex surfaces.

* * * * *